March 18, 1958     H. V. WIKNICH     2,827,032
SEALING MEANS FOR ENGINE VALVE MECHANISM
Filed Nov. 14, 1955

INVENTOR.
Harold V. Wiknich
BY
S. C. Thorpe
ATTORNEY

United States Patent Office 2,827,032
Patented Mar. 18, 1958

2,827,032

SEALING MEANS FOR ENGINE VALVE MECHANISM

Harold V. Wiknich, Parma, Ohio, assignor to General Motors Corporation, Detroit, Mich., a corporation of Delaware Application November 14, 1955, Serial No. 546,463

15 Claims. (Cl. 123—189)

This invention relates to valve mechanism for internal combustion engines and the like and more particularly to means for seating and supporting such valve mechanism.

In conventional structures of this type, an engine cylinder or other supporting structure defining a port controlled by a valve tends to distort under operative stresses imposed thereon such as the thermal stresses resulting from uneven cooling of the cylinder structure. This distortion results in ovalizing of the valve-supporting and valve-seating structures and, consequently, in the relatively unsatisfactory operation of the valve.

The invention has particular application to poppet valves and reciprocable compression-operated timing control valves such as are disclosed in the copending United States application of Gregory Flynn, Jr., now Patent No. 2,763,249; such valves being mounted in a valve housing inserted into a bore opening on the combustion chamber within an engine cylinder. However, the use of the invention is not limited to valves of this particular type and is considered to be adaptable to valve mechanisms generally which are subjected to similar operative conditions.

It is one of the principal objects of the invention to provide such a valve mechanism with means for isolating distortions of the cylinder or other supporting structure from the valve member thereby insuring proper operation of the valve mechanism.

Another object of the invention is to provide sealing means for such a valve mechanism having inherent resiliency so as to adapt itself in operation to all thermal and other distortions of the cylinder or valve-supporting structure.

These objects are attained in illustrative valve assemblies similar to those disclosed in the aforementioned application by providing a member forming at least one wall of a chamber and having a bore therein terminating in an entrance to the chamber with a valve mechanism mounted within the bore and including a seating member having an annular resilient portion thereof adapted to be maintained in sealing engagement with the entrance; the resilient portion extending outwardly of a relatively rigid central portion and having an external surface thereon adapted to circumferentially and resiliently engage the entrance with substantially line contact in a plane normal to the axis of the bore.

These and other objects and features of the invention will be more thoroughly understood from the following description of several preferred embodiments thereof in which reference is made to the attached drawings, wherein.

Figure 2:
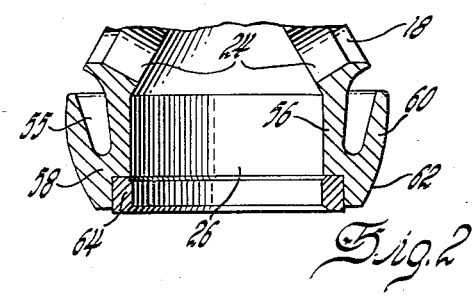
Figures 2 and 3 are sectional views of the seating portions of valve housings similar to that shown in Figure 1 and show the application of the invention in slightly different form.
Figure 3:
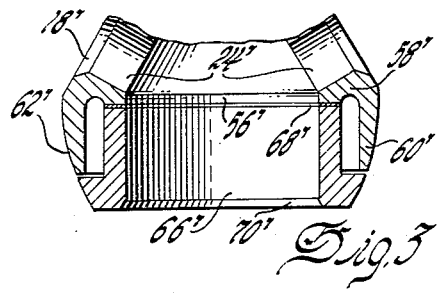
Figure 4:
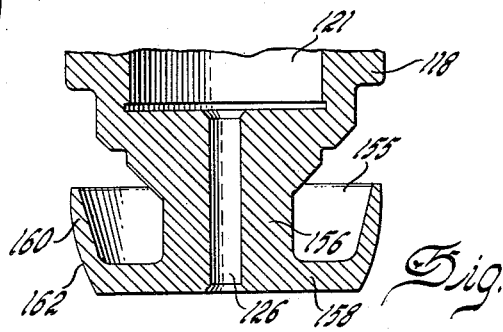
Figure 5:
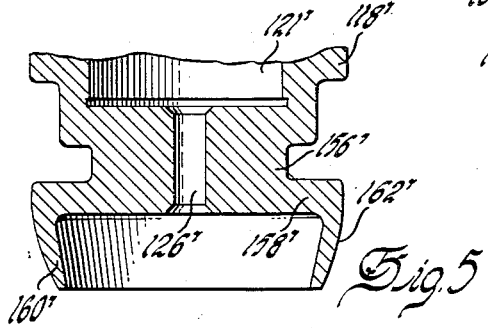
Figure 7:
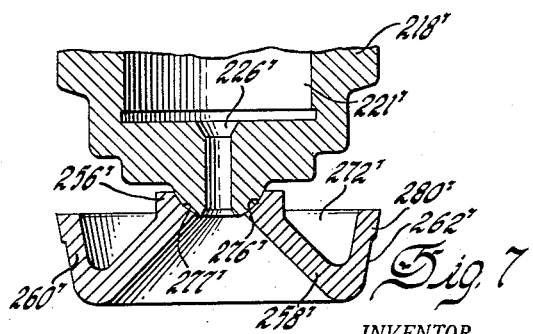
Figure 6:
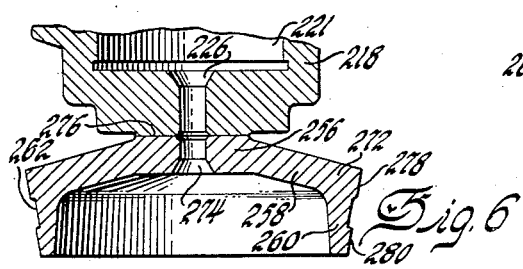

Figures 4 and 5 are sectional views similar to Figures 2 and 3 and show the application of the invention to housing cylinders for compression-operated timing valve mechanism such as utilized in the above-identified patent; and Figures 6 and 7 are sectional views similar to Figures 4 and 5, respectively, but show the application of the invention to seating members formed separately of the timing valve cylinders.

Figure 1:
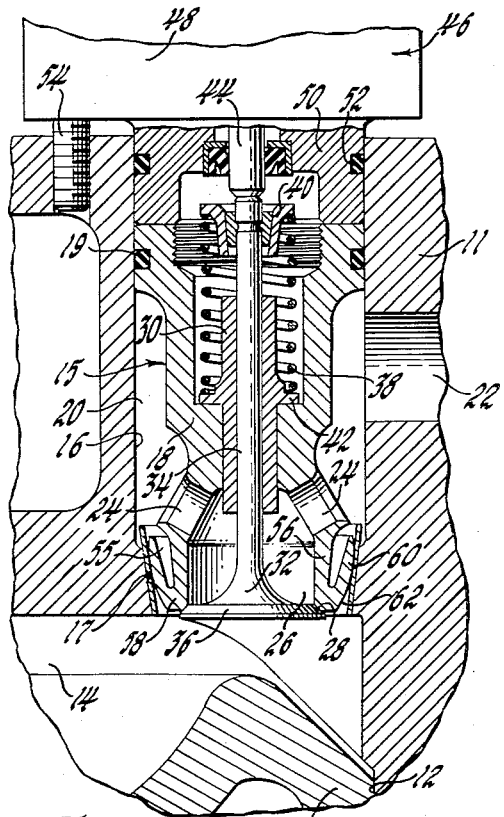
Figure 1 is a longitudinal sectional view of an internal combustion engine cylinder showing the invention as employed in conjunction with a gaseous fuel inlet valve.

Referring more particularly to the drawings, Figure 1 shows a cylinder head 11 forming one end of an engine cylinder 12 in which a conventional piston 13 is reciprocably mounted. Within the cylinder and between the piston and the cylinder head is a combustion chamber 14 into which gaseous fuel is introduced by a fuel inlet valve assembly indicated generally at 15. The valve assembly 15 is mounted in a bore or passage 16 extending through the cylinder head and terminating in a tapered entrance 17 to the combustion chamber.

The valve assembly comprises an elongated housing 18, the upper end of which is sealed with respect to the bore 16 by an annular seal 19 and the lower end of which is maintained in resilient sealing engagement with the tapered entrance or a soft metal gasket carried thereby as explained in greater detail below. The valve housing is of a reduced radial dimension intermediate its ends to form an annular chamber 20 in conjunction with the bore 16 interconnecting a fuel-delivery passage 22 in the cylinder head and passages 24 formed in the valve housing adjacent its lower end. The passages 24 open into a central outlet passage or chamber 26 which, in turn, terminates in a frusto-conical valve seat 28 opening to the combustion chamber. A bushing 30 carried by the housing 18 reciprocably mounts a poppet valve 32 including a valve stem 34 and a valve head 36 adapted to sealingly engage the valve seat 28. The upper end of the bushing serves as an internal guide for a spring 38 which is interposed between a spring-seating washer member 40 carried by the upper end of the valve stem and an annular boss 42 formed intermediate the ends of the bushing 30. The spring 38 biases the poppet valve to maintain the valve head in sealing engagement with the valve seat 28. The biasing action of the spring 38 also maintains the end of the valve stem in thrust engagement with an actuating member 44 of an actuator mechanism 46 such as is shown and described in the aforementioned patent application.

The actuator mechanism is provided with a housing 48 having a lower end portion 50 slidably mounted in the upper end of the bore 16 and sealed with respect thereto by an annular seal 52. The actuator housing is bolted to the cylinder head as indicated at 54; the bolts being tightened to exert an axial thrust through the lower end portion of the actuator housing thereby tending to maintain the lower end of the valve housing 18 in sealing engagement with the tapered entrance 17 to the engine cylinder.

In accordance with the invention, the lower end of the housing member is relieved, as indicated at 55, to provide a central portion 56 defining the valve outlet chamber or passage 26; an intermediate portion 58 radiating outwardly from the central portion and an outer annular sealing portion 60 extending longitudinally from the intermediate portion in concentrically spaced relation to the central portion. The outer portion 60 is tapered to provide a relatively thin wall of progressively reduced radial dimension from the intermediate radiating portion; the annular portion 60 remote from the intermediate portion being resilient with respect to the intermediate and central passage portions of the housing. The external surface 62 of the outer portion is of frusto-sphero-conical configuration and is adapted to resiliently engage the tapered entrance 17 with substantially circumferential line contact substantially in a plane normal to the axis of the valve and longitudinally spaced from the intermediate portion 58.

The thermal stresses tending to produce ovalizing of the valve seats and valve-supporting structure in an internal combustion engine vary as the temperature graduation through the supporting cylinder structure. Consequently, such thermal stresses will be at a maximum in the surface metal defining the combustion chamber. In the embodiment of the invention shown in Figure 1, the valve seat 28 is isolated completely from this zone of maximum ovalizing stress, and resilient deformation of the outer annular portion 60 prevents the transmission of the limited ovalizing distortion occurring at the plane of its line contact with the tapered entrance to the central valve seat portion.

The valve housing 18 in the embodiment shown in Figure 2 is practically identical with that shown in Figure 1 except that the relieving of its lower end as indicated at 55 is not as deep to accommodate the counter-boring of the central passage portion 56 to receive a valve seat insert 64.

In the form of the invention illustrated in Figure 3, the lower end of the valve housing 18' has a portion 58' radiating outwardly from a central passage portion 56' which is terminated immediately below the housing inlet passage 24'. A relatively resilient outer sealing portion 60' having a frusto-sphero-conical external surface 62' thereon extends from the intermediate portion 58' and is disposed longitudinally of the central passage portion 56'. A cylindrical member 66' is spacedly embraced within the outer portion 60' and is secured at one end to the central passage portion by a suitable bond or weldment such as indicated at 68'. The opposite end of the cylindrical member is provided with a frusto-conical surface 70' adapted to seat the head of the poppet valve. In the application of this embodiment of the invention to a valve mechanism, circumferential sealing contact between the sphero-conical external surface of the outer seating portion 60' and the tapered entrance occurs substantially in a plane intermediate the radially extending portion 58' and the valve-seating surface 70'. As with the form of Figure 1, ovalized distortion of the bore 16 is isolated from the valve seat and valve-supporting structure by flexure of the outer portion 60.

As indicated above, Figures 4, 5, 6, and 7 show the application of the invention to the housing cylinders for compression-operated timing valve mechanism such as shown and described in the above-identified patent.

Figure 4 shows a cylindrical housing 118 having a bore 121 therein adapted to reciprocably mount a compression-operated timing valve. The lower end of the housing 118 is provided with a central passage 126 interconnecting the chamber defined by the bore 121 with the combustion chamber of the engine cylinder. The lower end of the valve housing is also relieved externally, as indicated at 155, to define a central passage portion 156, an intermediate portion 158 extending laterally from the central portion, and an outer annular portion 160 having a frusto-sphero-conical external surface 162 thereon. The annular portion 160 corresponds to the portion 60 in the embodiment of Figure 1 and is adapted to be similarly maintained in sealing contact with the tapered seat by the axial thrust imposed on the valve housing by the actuator mechanism 48.

The form of the invention shown in Figure 5 is similar to that of Figure 4 and comprises a housing cylinder 118' having a valve-mounting bore 121' therein which is connectable to the combustion chamber of the cylinder by a central passage 126' extending longitudinally of a central portion 156' at the lower end of the valve housing. An intermediate portion 158' extends laterally from the central portion and a relatively thin-walled annular sealing portion 160' having a frusto-sphero-conical external surface 162' thereon extends longitudinally from the axial end of said intermediate portion opposite the central portion 156'. The axial thrust imposed on the valve housing 118' through the actuator housing causes the resilient annular portion to sealingly engage the tapered entrance 17 with circumferential line contact substantially in a plane longitudinally spaced from the intermediate portion 158' and the passage end of the central portion 156'.

Figure 6 shows the invention as incorporated into a sealing gasket 272 formed separately of a valve housing 218 similar to that shown in Figures 4 and 5 and having a bore 221 therein for reciprocably mounting a compression-operated timing valve mechanism. The bore 221 is connectable to the combustion chamber 14 of the engine through a passage 226 formed in the lower end of the valve housing and through an opening 274 provided in the gasket member 272. The gasket member comprises a central portion 256 defining the opening 274 and having a lapped upper end surface 276 mating with a similar surface on the lower end of the valve housing 218 to provide pressure-sealing contact therebetween. An outer annular sealing portion 260 is spaced longitudinally of the central portion 256 and is connected thereto by an intermediate laterally extending portion 258. The external surface 262 of the resilient sealing portion 260, unlike the external surfaces of the hereinbefore described embodiments which are frusto-sphero-conical in configuration, is essentially frusto-conical with two annular bosses formed thereon; the first boss 278 being adjacent the intermediate portion and the second boss 280 being adjacent the end thereof remote from the intermediate portion.

In practice, the axial thrust imposed on the valve housing 218 biases the lower end of the valve housing into pressure-sealing contact with the end surface 276 of the central portion of the gasket member 272. The axial thrust thereby imposed on the gasket member 272 urges the gasket member and, more particularly, the external bosses 278 and 280 into pressure-sealing contact with the seat provided by the tapered entrance 17. The axial thrust imposed on the gasket member also tends to flatten the gasket member flexing the intermediate portion 258 which, in turn, tends to urge the resilient outer portion 260 outwardly carrying the bosses 278 and 280 outwardly to increase the pressure between the boss and the tapered seat 17.

In this form of the invention, the relatively high expansive and contractive thermal stresses at the surface of the combustion chamber are accommodated by the flexure of the unsupported end of the outer portion of the gasket. The stresses imposed on the gasket member at the boss 278 will be relatively small and will be accommodated by flexure of the gasket member and isolated from the valve housing 218 by transverse slippage between the end surfaces of the housing and the central portion of the gasket.

Figure 7 shows a modified form of the invention similar to that of Figure 6; the sealing means being in the form of a separate gasket interposed between the valve housing 218' and the tapered entrance 17 to the combustion chamber. The end of the valve housing having passage 226' therein connecting the valve-mounting bore 221' to the combustion chamber is provided with a spherical external surface, as indicated at 277', which is adapted to sealingly engage a concave mating surface 276' formed in a central portion 256' of the gasket member 272'. An intermediate portion 258' extends laterally and longitudinally from the central portion 256' and an outer annular sealing portion 260' extending longitudinally from the intermediate portion. The external surface 262' of the outer portion is essentially frusto-conical and is provided with an external boss 280' remote from the intermediate portion adapted to engage the tapered seat 17 with substantially circumferential line contact in a plane normal to the axis of the valve housing.

As in the form of the invention in Figure 6, ovalizing of the seat 17 is isolated by flexure of the gasket member 272' and isolated from the valve housing 218' by slippage between the mating surfaces of the housing and the gasket. However, in this form of the invention, the spherical convex and concave mating surfaces are adapted to accommodate universal slippage therebetween.

Several embodiments of the invention have been shown and described for the purpose of properly illustrating the breadth of the invention. It will, of course, be understood by those skilled in the art that many modifications may be made within the principles of the invention without departing from the spirit and scope thereof as defined by the following claims.

I claim:

1. In combination, a member forming one wall of a chamber and having a passage therein opening to said chamber, a sealing member inserted in said opening, said member including a central portion having a port therein opening to said chamber, an intermediate portion radiating from said central portion, and an annular portion extending longitudinally thereof from said intermediate portion, the outer surface of said longitudinally extending portion being adapted to resiliently engage said passage with circumferential sealing contact substantially in a plane longitudinally spaced from said intermediate portion, and means for maintaining said member within said passage.

2. In combination with a cylinder for an internal combustion engine having a bore therein terminating in a tapered entrance to the combustion chamber of the cylinder, a housing for a valve mechanism mounted in said bore and adapted at one end to be maintained in sealing engagement with said tapered entrance, said housing end including a central portion having a passage therein opening on said combustion chamber, and a longitudinally extending annular portion connected at one end thereof to said central portion and having a frusto-conical external surface thereon adapted to engage said tapered entrance with substantially circumferential line contact adjacent the opposite end thereof.

3. In a cylinder assembly for an internal combustion engine or the like, a cylinder member having a bore therein terminating with an inwardly tapered opening to the interior of the cylinder, an elongated valve housing inserted in said bore, said housing adjacent the interior of the cylinder having a central portion having a passage therein opening to the interior of the cylinder and having a relatively resilient outer anular portion extending longitudinally of and in radially spaced relation to said central portion, said outer portion being connected at one end thereof to said central portion, and means for maintaining said outer portion in resilient sealing engagement with said tapered opening with circumferential line contact substantially in a plane normal to the axis of said opening and disposed longitudinally of said intermediate housing portion.

4. In an expansible chamber device, a cylinder defining one end of an expansible chamber and having a bore therein terminating in a tapered entrance to the expansible chamber, valve mechanism mounted in said bore and including a seating member therefor in sealing engagement with said tapered entrance, said seating member including an inner centrally apertured portion, a radially extending intermediate portion, and an outer longitudinally extending portion, said outer portion having a frusto-conical external surface and being adapted to resiliently engage said tapered entrance with substantially circumferential line contact adjacent the end thereof opposite said intermediate portion.

5. In combination with a cylinder member for an engine having a bore therethrough opening to the interior of the cylinder, a poppet valve including a valve head and a stem, a valve housing mounted in said bore and reciprocably mounting the poppet valve, said valve housing adjacent one end thereof forming a passage surrounding the stem and terminating in a seat for the valve head, the passage end of said housing having a portion extending outwardly therefrom and an outer annular portion extending longitudinally from said first-mentioned portion, the unsupported end of said longitudinally extending portion being resilient relative to the passage end of said housing and having substantially circumferential line contact with said bore, said line contact being longitudinally spaced from said first-mentioned portion.

6. In a cylinder assembly for an engine or the like, a cylinder member having a bore therethrough opening to the interior of the cylinder, a poppet valve including a valve head and a stem reciprocably mounted within said bore, a sealing member inserted in said bore adjacent the end thereof opening to the interior of the cylinder, said sealing member including an inner annular portion, an intermediate portion extending radially outwardly from said inner portion, and an outer annular portion extending longitudinally from said intermediate portion, the unsupported end of said longitudinally extending portion being resilient relative to said inner and intermediate portions and being adapted to sealingly engage said bore with substantially circumferential line contact, said line contact being substantially in a plane normal to the axis of the sealing member and longitudinally spaced from said intermediate portion, and means for maintaining said sealing member within said bore.

7. The cylinder assembly as set forth in claim 6 and including an annular member forming a valve seat for said poppet valve, said valve seat member being secured to the inner portion of said sealing member adjacent said intermediate portion.

8. The cylinder assembly as set forth in claim 6 and including a cylindrical member secured at one end to the inner portion of said sealing member and terminating at its opposite end in a seat for said valve head remote from said intermediate portion.

9. The cylinder assembly as set forth in claim 6 and including an annular member inserted within the inner and intermediate portions of said sealing member and forming a seat for the head of said poppet valve.

10. In combination with a cylinder member for an engine or the like having a cylinder chamber therein and having a bore therethrough opening to the cylinder chamber, a housing mounted in said bore and adapted to reciprocably mount an engine-controlling valve mechanism, said housing having a passage therein opening to the cylinder chamber, the passage end of said housing having a portion extending outwardly therefrom and a relatively thin annular portion extending longitudinally from said lateral portion, said annular portion remote from said outwardly extending portion being resilient with respect to the passage end of said housing and being adapted to sealingly engage said bore substantially in a plane longitudinally spaced from said outwardly extending portion and the end of said passage.

11. In combination, a member forming at least one wall of a chamber and having a passage terminating in a tapered entrance to said chamber, a housing member mounted in said bore and adapted to reciprocably mount a valve mechanism, said housing member having a passage therein opening toward said chamber, a sealing member resiliently interposed between said housing and said entrance, said member including a central portion having a passage therein aligned with said housing passage, an intermediate portion radiating from said central portion, and an annular outer portion extending longitudinally from said intermediate portion, said longitudinally extending portion being resilient with respect to said central portion and having a frusto-conical outer surface adapted to sealingly engage said tapered entrance with circumferential line contact substantially in a plane longitudinally spaced from said intermediate portion, and means urging said housing and said central portion into sealing contact, the mating surfaces thereof being adapted to accommodate limited slippage therebetween.

12. The combination set forth in claim 11 in which the mating surfaces of said housing and said central portion are adapted to accommodate limited universal slippage therebetween.

13. The combination set forth in claim 11 in which the mating surfaces of said housing and said central portion are adapted to accommodate limited transverse slippage therebetween.

14. The combination set forth in claim 1 in which the central portion and said outer portion are concentrically disposed on the same side of the intermediate portion.

15. The combination set forth in claim 1 in which said central portion and said outer portion are disposed longitudinally from the opposite axial ends of said intermediate portion.

References Cited in the file of this patent
UNITED STATES PATENTS

| | | |
|---|---|---|
| 2,667,155 | Paluch et al. | Jan. 26, 1954 |
| 2,718,220 | Brill | Sept. 20, 1955 |
| 2,763,249 | Flynn, Jr. | Sept. 18, 1956 |